United States Patent
Tamura et al.

(10) Patent No.: US 6,840,104 B2
(45) Date of Patent: Jan. 11, 2005

(54) APPARATUS AND METHOD FOR TESTING ROTATIONAL BALANCE OF CRANKSHAFT

(75) Inventors: Eiji Tamura, Tsuga-machi (JP); Yasunori Yamazaki, Sidney, OH (US); Joseph Makin, Bellefontaine, OH (US); Hiroki Miura, Hachioji (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/438,568

(22) Filed: May 15, 2003

(65) Prior Publication Data

US 2003/0230142 A1 Dec. 18, 2003

(30) Foreign Application Priority Data

May 16, 2002 (JP) ........................................ 2002-141488
May 12, 2003 (JP) ........................................ 2003-133565

(51) Int. Cl.[7] .............................................. G01M 1/22
(52) U.S. Cl. .............................. 73/462; 73/1.84; 702/56
(58) Field of Search .......................... 73/1.84, 66, 460, 73/462, 471, 473, 475; 702/56

(56) References Cited

U.S. PATENT DOCUMENTS

| 3,681,967 A | * | 8/1972 | Hines et al. ................. 73/1.14 |
| 4,646,570 A | * | 3/1987 | Schoenfeld ................. 73/462 |
| 6,595,052 B2 | * | 7/2003 | Wharton ..................... 73/460 |
| 2001/0020387 A1 | * | 9/2001 | Miura ........................ 73/462 |

* cited by examiner

Primary Examiner—Hezron Williams
Assistant Examiner—John Hanley
(74) Attorney, Agent, or Firm—Standley Law Group LLP (57) ABSTRACT

Measurement is made of centrifugal force produced on a crankshaft to be tested that is being rotated about its rotation axis, to provide centrifugal force variation information of the crankshaft. Also, measurement is made of errors in respective rotational phases of crankpins of the crankshaft about rotation axes of the crankpins. Dummy information, comprising rotational unbalance data representative of rotational unbalance components to be removed from the centrifugal force variation information of the crankshaft, is created using the measured errors in the respective rotational phases. Then, an initial rotational unbalance value of the crankshaft is determined, using the dummy information and the centrifugal force variation information of the crankshaft.

14 Claims, 3 Drawing Sheets

APPARATUS AND METHOD FOR TESTING ROTATIONAL BALANCE OF CRANKSHAFT

FIELD OF THE INVENTION

The present invention relates to an improved crankshaft rotational balance testing apparatus and method for measuring rotational balance conditions of crankshafts.

BACKGROUND OF THE INVENTION

In some cases, predetermined rotational unbalance is intentionally left unremoved, i.e. preset, on rotating members, such as crankshafts, when adjusting dynamic rotational balance conditions of the rotating members, for the following reasons. In the case of a crankshaft of an engine, for example, inertial force of the crankshaft would not appropriately balance as a whole even if the crankshaft itself has been adjusted independently into perfect rotational balance, due to the fact that pistons, connecting rods, etc. are connected with the crankshaft. Such unbalanced inertial force would cause great oscillation of the crankshaft during rotation about the crankshaft's rotation axis. To address the inconvenience, it has been known to make balance adjustment of a crankshaft such that predetermined appropriate rotational unbalance is intentionally left or preset on the crankshaft so that, with the pistons etc. connected with the crankshaft, the inertial force caused by the rotational unbalance of the crankshaft can cancel out a portion of inertial force caused by the reciprocating mass of the pistons etc.

Roughly classified, there have been three major schemes for adjusting a dynamic rotational balance condition of a crankshaft such that predetermined rotational unbalance is intentionally left or preset on the crankshaft for smooth rotation.

According to the first adjustment scheme, dummy rings of given weight values, previously measured or calculated using a predetermined reference crankshaft, which correspond to the predetermined rotational unbalance to be preset on the crankshaft, are attached to the individual crankpins of the crankshaft, and an initial rotational unbalance value of the crankshaft is determined by detecting a balanced state of the crankshaft rotating about its rotation axis while measuring a balance condition of the crankshaft by means of a rotational balance testing apparatus. Then, a correction amount and angular position of the rotational unbalance are determined.

According to the second adjustment scheme, a spindle is connected to a crankshaft on an oscillatable measuring table, a dummy weight equivalent to a previously calculated value, which corresponds to predetermined rotational unbalance to be preset on the crankshaft, is attached to the spindle, and an initial rotational unbalance value is determined by balancing the spindle in synchronism with the crankshaft. Then, a correction amount and angular position of the rotational unbalance are determined.

Further, according to the third adjustment scheme, a crankshaft is rotated about its rotation axis alone with no dummy ring or dummy weight attached thereto, and a value of rotational unbalance caused during the rotation is detected by oscillation pickups as analog oscillation signals. The analog oscillation signals are converted via A/D (Analog-to-Digital) converters into digital signals, and then the digital detected values of the rotational unbalance are subtracted from previously-known dummy weight values, represented by digital dummy information, to thereby determine an initial rotational unbalance value. Then, a correction amount and angular position of the rotational unbalance are determined.

Generally, actual rotational balance adjustment of the crankshaft after the aforementioned measurement of the rotational balance condition is performed by drilling holes of optimal depths in optimal positions of counterweights of the crankshaft on the basis of the rotational unbalance correction amount and angular position determined in the above-described manner.

However, the above-mentioned first adjustment scheme requires attachment/detachment of the dummy rings for each crankshaft to be measured. Further, where one and the same apparatus is used to measure rotational balance conditions of many models of crankshafts, it is necessary to prepare a different set of dummy rings for each of the models and replace the dummy ring set whenever a changeover is to take place from one crankshaft model to another. For these reasons, the first adjustment scheme necessitates preparation of various types of dummy rings and encounters considerable difficulties in automatizing the rotational balance condition measurement.

The above-mentioned second and third adjustment schemes, on the other hand, can eliminate the need for attachment/detachment of dummy rings for each crankshaft to be measured. However, if a crankpin to be tested has rotational phase errors beyond an allowable range, the measured results would undesirably contain great errors so that unsatisfactory balance adjustment, incapable of appropriately removing undesired rotational unbalance, tends to be performed on the crankshaft.

SUMMARY OF THE INVENTION

In view of the foregoing prior art problems, it is an object of the present invention to provide a crankshaft rotational balance testing apparatus and method which can facilitate automatization of rotational unbalance condition measurement of crankshafts and which, even where crankpins of a crankshaft have rotational phase errors, can accurately measure a rotational balance condition of the crankshaft.

In order to accomplish the above-mentioned object, the present invention provides a crankshaft rotational balance testing apparatus, which comprises: a crankshaft rotation section for rotating a crankshaft to be tested about a rotation axis of the crankshaft; a centrifugal force measurement section for measuring centrifugal force produced on the crankshaft being rotated by the crankshaft rotation section, to provide centrifugal force variation information of the crankshaft; a phase error measurement section for measuring errors in respective rotational phases of crankpins of the crankshaft about rotation axes of the crankpins; a dummy information generation section for creating dummy information comprising rotational unbalance data representative of rotational unbalance components to be removed from the centrifugal force variation information of the crankshaft, using measured results of the phase error measurement section; and an initial unbalance value calculation section for calculating an initial rotational unbalance value of the crankshaft, using the dummy information and the centrifugal force variation information of the crankshaft.

In the crankshaft rotational balance testing apparatus of the present invention, errors in the respective rotational phases of the individual crankpins of the crankshaft to be tested are determined, and dummy information is created on the basis of the thus-determined rotational phase errors. Therefore, even where the rotational phase errors of the crankpins of the crankshaft to be tested are beyond an allowable range, an initial rotational unbalance value obtained by the inventive crankshaft rotational balance testing apparatus can be equivalent to an initial rotational unbalance value that is measured with dummy weights actually attached to the individual crankpins of the crankshaft. Therefore, the present invention can facilitate automatization of the rotational balance condition measurement and can accurately measure a rotational balance condition of each crankshaft to be tested even where the phases of the crankpins have errors.

In a preferred form, the crankshaft rotational balance testing apparatus further comprises an angle detection section for detecting a rotational angle of the crankshaft to be tested and a memory section for storing various information of crankshafts, information indicative of respective predetermined angles of crankpins of a reference crankshaft being prestored in the memory section. In this case, the phase error measurement section includes: a crankpin angle measurement section for measuring respective angles of the crankpins relative to the rotational angle of the crankshaft to be tested; and a phase error calculation section for comparing the measured angles of the crankpins to the predetermined angles of corresponding crankpins of the reference crankshaft prestored in the memory section, to calculate respective rotational phase errors of the crankpins of the to-be-tested crankshaft relative to the predetermined angles of the corresponding crankpins of the reference shaft. With such arrangements, the present invention can accurately and precisely measure a rotational balance condition of each crankshaft to be tested, even where the crankpins have rotational phase errors.

Preferably, the dummy information generation section creates the dummy information by offsetting the dummy information of the crankpins prestored in the memory by the rotational phase errors of the individual crankpins measured by the phase error measurement section. In this way, the dummy information generation section can create accurate dummy information.

Further, in the crankshaft rotational balance testing apparatus of the present invention, the dummy information of a given one of the crankpins may be the centrifugal variation information obtained when a reference crankshaft is rotated about its rotation axis with a dummy weight attached to each of the other crankpins than the given crankpin.

According to another aspect of the present invention, there is provided a crankshaft rotational balance testing method, which comprises the steps of: measuring centrifugal force produced on a crankshaft to be tested that is being rotated about its rotation axis, to provide centrifugal force variation information of the crankshaft; measuring errors in respective rotational phases of crankpins of the crankshaft about rotation axes of the crankpins; creating dummy information comprising rotational unbalance data representative of rotational unbalance components to be removed from the centrifugal force variation information of the crankshaft, using the measured errors in the respective rotational phases; and determining an initial rotational unbalance value of the crankshaft, using the dummy information and the centrifugal force variation information of the crankshaft. With such arrangements, the present invention can facilitate automatization of the rotational balance condition measurement and can accurately measure a rotational balance condition of each crankshaft to be tested even where the phases of the crankpins have errors.

The crankshaft rotational balance testing method may further comprise the steps of: detecting a rotational angle of the crankshaft to be tested; measuring respective angles of the crankpins relative to the rotational angle of the crankshaft to be tested; and comparing the measured angles of the crankpins to prestored predetermined angles of corresponding crankpins of a reference crankshaft, to calculate respective rotational phase errors of the crankpins of the to-be-tested crankshaft relative to the predetermined angles of the corresponding crankpins of the reference shaft. With such arrangements, the present invention can accurately measure a rotational balance condition of each crankshaft to be tested, even where the crankpins have rotational phase errors.

Preferably, the dummy information is created by offsetting the dummy information of the crankpins prestored in a memory by the measured rotational phase errors of the individual crankpins. In this way, the present invention can create precise and accurate dummy information, and it can accurately measure a rotational balance condition of the crankshaft using the accurate dummy information.

Further, according to the crankshaft rotational balance testing method, the dummy information of a given one of the crankpins may be the centrifugal variation information provided when a reference crankshaft is rotated about its rotation axis with a dummy weight attached to each of the other crankpins than the given crankpin. Thus, the present invention can perform a precise and accurate crankshaft rotational balance test using the centrifugal variation information.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
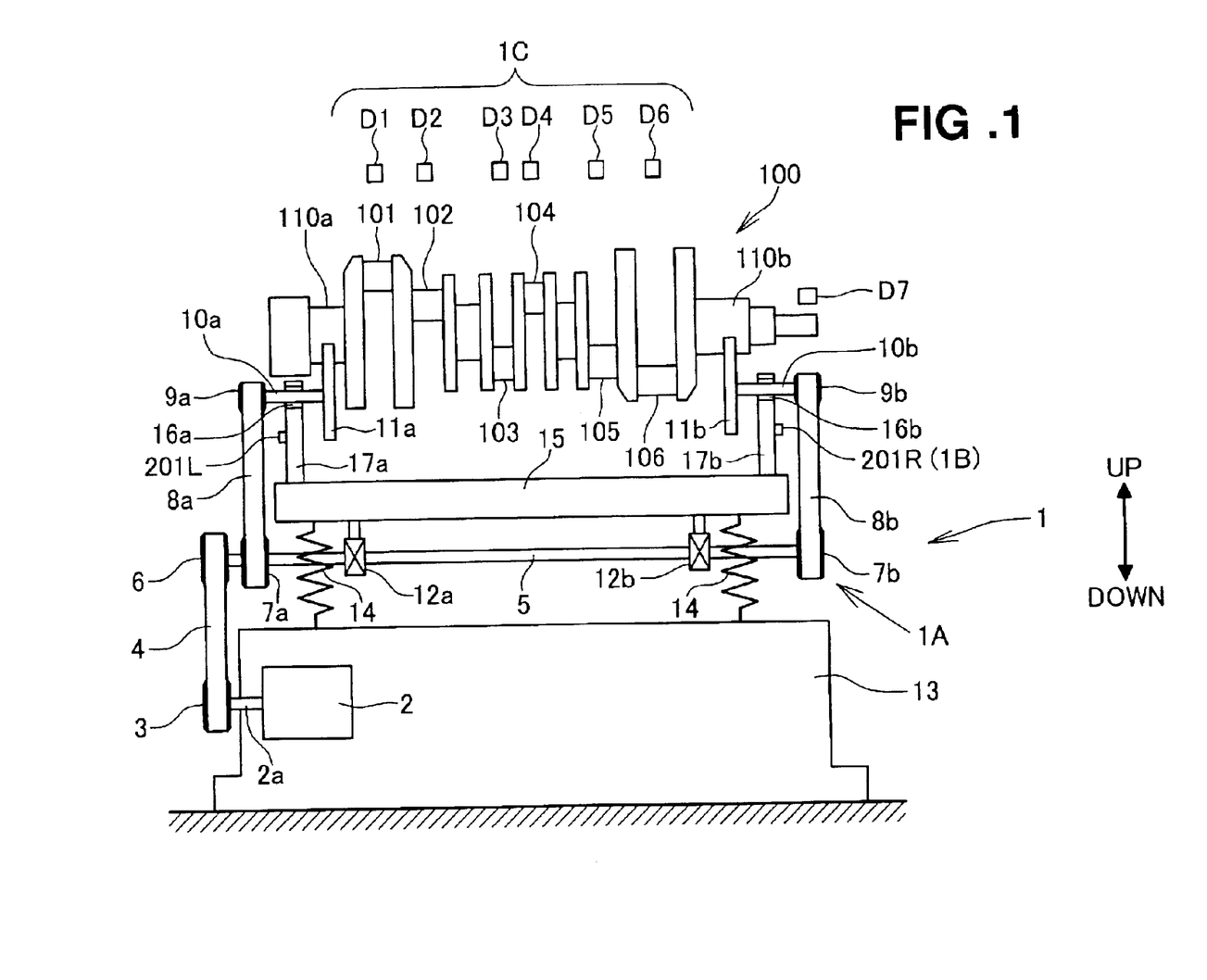
FIG. 1 is a front view of a measurement section of a crankshaft rotational balance testing apparatus in accordance with an embodiment of the present invention.
Figure 2:
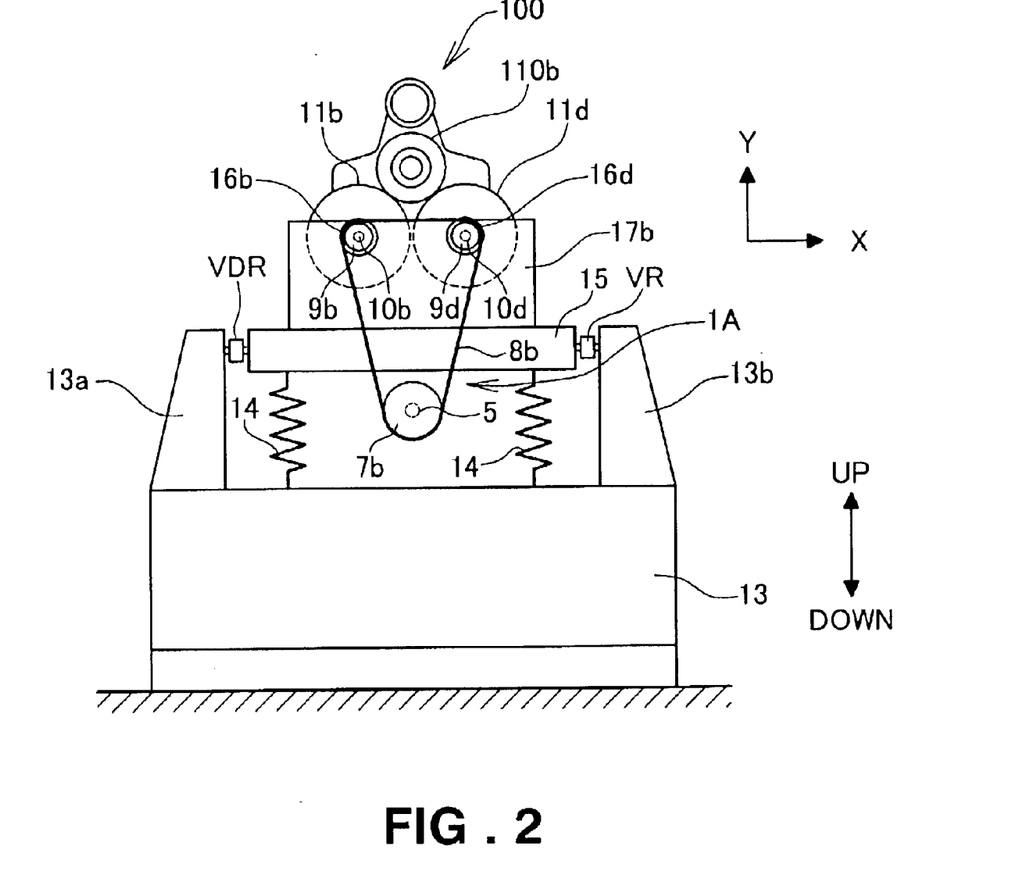
FIG. 2 is a side view of the crankshaft rotational balance testing apparatus of FIG. 1.

Initial reference is made to FIG. 1 showing in front elevation a measurement section of a crankshaft rotational balance testing apparatus in accordance with an embodiment of the present invention, and to FIG. 2 showing in side elevation the crankshaft rotational balance testing apparatus of FIG. 1.

In the crankshaft rotational balance testing apparatus shown in FIGS. 1 and 2, the measurement section 1 includes a framework that includes a base 13, damper springs 14 extending vertically upward from the upper surface of the base 13 and an oscillatable measuring table 15 supported by the springs 14 above the base 13. The measurement section 1 also includes a crankshaft rotation mechanism 1A, a centrifugal force measuring unit 1B, and a rotational phase error measuring unit 1C.

The crankshaft rotation mechanism 1A rotates a to-be-tested crankshaft about the rotation axis of the crankshaft. The rotation mechanism 1A includes drive shaft bearings 12a and 12b secured to the underside of the measuring table 15. Horizontal drive shaft 5 is rotatably supported via the shaft bearings 12a and 12b.

Motor 2 is secured to the base 13, and a motor pulley 3 is mounted on a drive shaft 2a of the motor 2. First pulley 6 is mounted on one end of the drive shaft 5 and a first endless belt 4 is wound on the first pulley 6 and the motor pulley 3, so that the drive shaft 5 can be driven to rotate via the endless belt 4 by activation of the motor 2.

First and second side walls 17a and 17b are secured to the upper surface of the table 15 and extend vertically upward from the table's upper surface in parallel opposed relation to each other. The first and second side walls 17a and 17b each have extremely high rigidity as compared to the spring constant of the springs 14, and each of these side walls 17a and 17b functions as a kind of rigid member. Driven shaft bearings 16a and 16c are secured to the first side wall 17a, while driven shaft bearings 16b and 16d are secured to the second side wall 17b. Although only the driven shaft bearings 16a and 16b are shown or visible in FIG. 1, the driven shaft bearings 16c and 16d are disposed behind the bearings 16a and 16b in the illustrated example. The driven shaft bearings 16a, 16b, 16c and 16d rotatably support driven shafts 10a, 10b, 10c and 10d, respectively (only the driven shafts 10a and 10b are shown or visible in FIG. 1).

Pulleys 9a, 9b, 9c and 9d are mounted on respective one ends of the driven shafts 10a, 10b, 10c and 10d. Further, a second pulley 7a is mounted on one end portion of the drive shaft 5 adjacent the first pulley 6, and another second pulley 7b is mounted on the other end of the drive shaft 5. Second endless belt 8a is wound on the second pulley 7a, pulley 9a mounted on the driven shaft 10c and pulley 9c mounted on the driven shaft 10c, and another second endless belt 8b is wound on the second pulley 7b,pulley 9b mounted on the driven shaft 10b and pulley 9d mounted on the driven shaft 10d. Thus, the driven shafts 10a, 10b, 10c and 10d can be rotated, via the second endless belts 8a and 8b, in response to rotation of the drive shaft 5; that is, the driven shafts 10a and 10c are rotated via the belt 8a while the driven shafts 10b and 10d are rotated via the belt 8b.

Rollers 11a, 11b, 11c and 1id are mounted on the respective other ends of the driven shafts 10a, 10b, 10c and 10d. The crankshaft 100 to be tested is positioned at its one end 110a on the rollers 11a and 11c and positioned at the other end 110b on the rollers 11b and 11d. With the arrangements set forth above, the crankshaft 100 can be rotated about its rotation axis by activation of the motor 2 via the rollers 11a, 11b, 11c and 11d.

The centrifugal force measuring unit 1B is arranged to measure centrifugal force produced on the to-be-tested crankshaft 100 rotating about its rotation axis, to provide centrifugal force variation information of the crankshaft 100. Namely, due to the mass of the crankpins 101–106 provided at various different positions of the to-be-tested crankshaft 100 that is rotating on the rollers 11a, 11b, 11c and 11d mounted on the first and second side walls 17a and 17b secured to the table 15 supported via the damper springs 14, a force moment acting on the crankshaft 100 are produced by a resultant of centrifugal force produced on the crankshaft 100 through the rotation of the crankpins 101–106 and a composite moment of the centrifugal force. The centrifugal force measuring unit 1B detects positional variation of the center axis of the crankshaft 100 which are caused by the force and moment acting on the crankshaft 100. In the instant embodiment, the centrifugal force measuring unit 1B comprises oscillation pickups 201L and 201R for the detecting the positional variation of the crankshaft' center axis.

The oscillation pickups 201L and 201R are mounted on the first and second side (left and ride side in FIG. 1) walls 17a and 17b,respectively, so that load variation produced due to rotational unbalance of the rotating crankshaft 100 can be measured on the basis of detected results of the oscillation pickups 201L and 201R. The oscillation pickups 201L and 201R are each an acceleration sensor capable of detecting acceleration in two directions, i.e. the vertical (up-and-down) direction of FIG. 1 and direction perpendicular to both the vertical direction and the axial direction of the crankshaft 100. In the following description, the vertical direction of FIG. 1 will be referred as a "Y-axis direction", while the direction perpendicular to both the vertical direction and the axial direction of the crankshaft will be referred as an "X-axis direction".

The phase error measuring unit 1C is arranged to measure rotational phase errors of the crankpins 101–106 about their respective rotation axes. The phase error measuring unit 1C includes a plurality of phase sensors D1, D2, D3, D4, D5 and D6 provided in corresponding relation to the crankpins 101, 102, 103, 104, 105 and 106 of the crankshaft 100. Each of the phase sensors D1–D6 detects when the crankpin corresponding thereto is right in front of (i.e., is passing the front of) the phase sensor. Another sensor D7 is provided for detecting a key groove formed in the other end 110b of the crankshaft 100 adjacent the side wall 17b. In the instant embodiment, respective rotational phases of the crankpins 101–106 relative to the key groove are calculated on the basis of detected results of these sensors. Rotational phase differences between the crankpins 101–106 can be calculated, using the calculated rotational phases of the crankpins 101–106. The sensor 7 also detects a rotational angle of the crankshaft 100, and thus, the sensor D7 and phase sensors D1–D6 together constitute a crankpin angle measurement device for measuring respective angles of the crankpins 101–106 relative to the rotational angle of the crankshaft 100.

Figure 3:
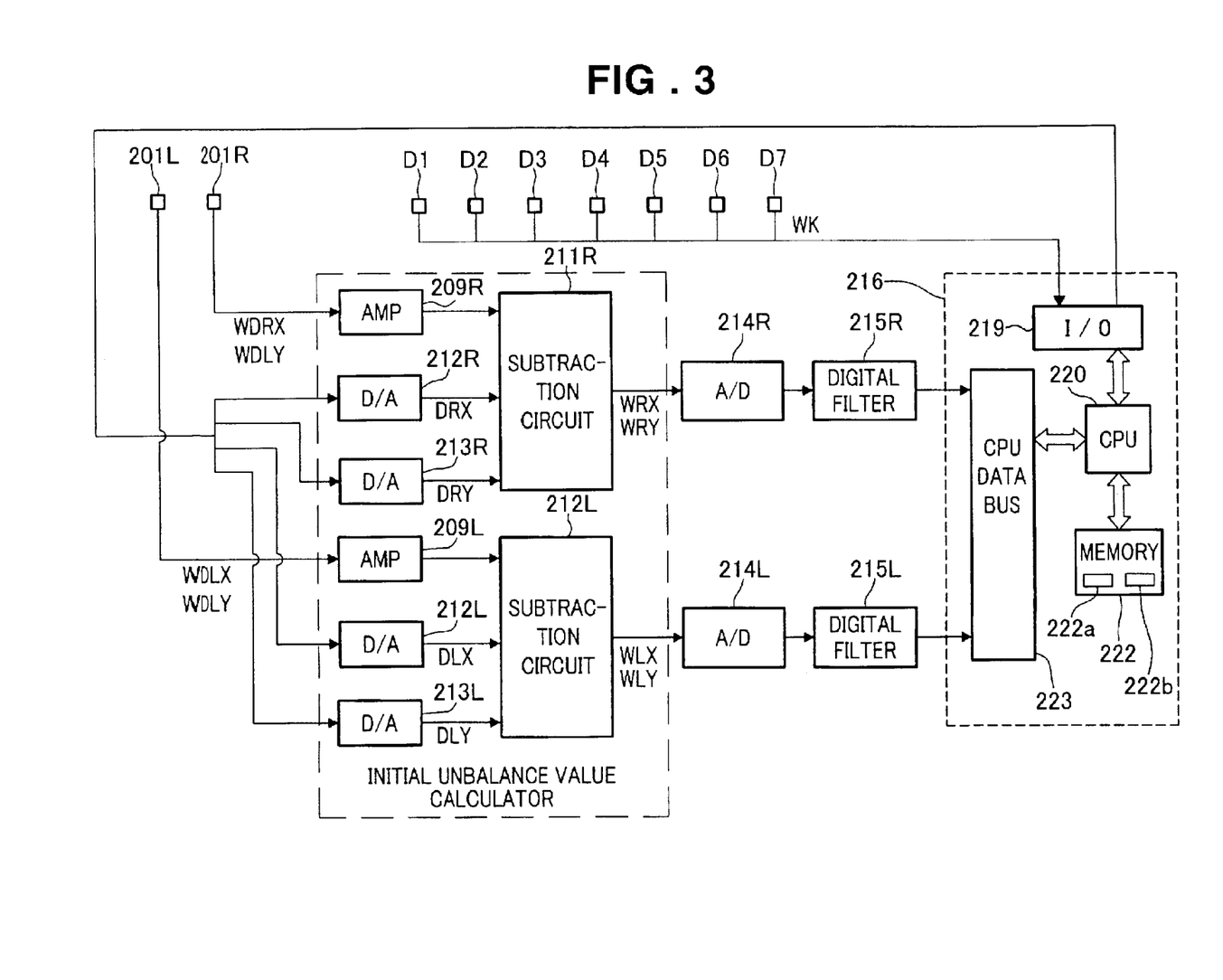
FIG. 3 is a block diagram illustrating details of a control section of the crankshaft rotational balance testing apparatus of FIG. 1.

Reference is now made to FIG. 3 illustrating in block diagram details of a control section of the crankshaft rotational balance testing apparatus of the present invention. Controller 216 included in the control section includes a CPU 220, a memory 222, a CPU data bus 223 and an I/O port 219. The control section also includes an amplifier circuit 209R for amplifying the output signals from the oscillation pickup 201R, an amplifier circuit 209L for amplifying the output signals from the oscillation pickup 201L, and D/A converters 212R, 213R, 212L and 213L for converting output signals from the controller's I/O port 219 into analog representation. The control section also includes a subtraction circuit 211R for subtracting the converted signals from the D/A converters 212R and 213R from the amplified signals from the amplifier circuit 209R, a subtraction circuit 211L for subtracting the converted signals from the D/A converters 212L and 213L from the amplified signals from the amplifier circuit 209L, an A/D converter 214R for converting the output signals from the subtraction circuit 211R into digital representation, and an A/D converter 214L for converting the output signals from the subtraction circuit 211L into digital representation. Further, the control section includes a digital filter 215R for filtering the converted signals from the A/D converter 214R, and a digital filter 215L for filtering the converted signals from the A/D converter 214L. Detailed construction and operation of the control section will be set forth later.

The outputs of the above-mentioned phase sensors D1, D2, D3, D4, D5 and D6 and key groove/crankpin angle sensor D7 (e.g., the outputs of respective light-receiving elements of the sensors D1–D7) are coupled to the I/O port 219 of the controller 216. In the memory 222 of the controller 216, there is prestored a dummy information generation program, as at 222a, as a means for, by use of the measured results of the phase error measurement unit 1C, generating dummy information which comprises rotational unbalance data representative of rotational unbalance components to be removed from the centrifugal force variation information of the crankshaft. The amplifier circuit 209R, D/A converters 212R, 213R, amplifier circuit 209L, D/A converters 212L, 213L and subtraction circuits 211R, 211L together constitute an initial unbalance value calculation unit for calculating initial rotational unbalance values of the crankshaft 100 using the dummy information and centrifugal force variation information of the crankshaft. Also prestored in the memory 222 of the controller 216 is a rotational phase error calculating program, as at 222b, for comparing the respective angles of the crankpins 101–106 of the to-be-tested crankshaft 100, measured by the crankpin angle measurement device, to predetermined rotational angles of corresponding crankpins of a reference crankshaft also prestored in the memory 222, so as to calculate rotational phase errors of the crankpins 101–106 of the to-be-tested crankpin 100 from the corresponding crankpins of the reference crankshaft.

The subtraction circuits 211L and 211R are connected, via the corresponding amplifier circuits 209L and 209L, to the oscillation pickups 201 and 201, respectively, positioned on the left and right sides of FIG. 1. The subtraction circuit 211L receives analog oscillation signals WDLX and WDLY indicative of oscillation, in the X-axis and Y-axis directions, of the crankshaft 100 detected via the oscillation pickup 201L, while the subtraction circuit 211R receives analog oscillation signals WDRX and WDRY indicative of oscillation, in the X-axis and Y-axis directions, of the crankshaft 100 detected via the oscillation pickup 201R. The D/A converters 212L, 213L and D/A converters 212R, 213R, which are connected with the subtraction circuits 211L and 211R, output analog dummy information signals DLX, DLY and DRX, DRY to the subtraction circuits 211L and 211R, respectively.

Each of the D/A converters 212L, 213L, 212R and 213R is connected to the I/O port 219 of the controller 216. The CPU 220 of the controller 216 transmits digital dummy data to these D/A converters 212L, 213L and 212R, 213R. In turn, the D/A converters 212L, 213L and 212R, 213R convert the digital dummy data into analog dummy signals DLX, DLY and DRX, DRY. Example manner in which the CPU 220 generates the digital dummy data will be later described in detail.

To the subtraction circuit 211L are input the analog oscillation signals WDLX and WDLY from the oscillation pickup 20L and the analog dummy signals DLX and DLY from the D/A converters 212L and 213L. Thus, the subtraction circuit 211L subtracts the value of the analog dummy signal DLX from the value of the analog oscillation signal WDLX and subtracts the value of the analog dummy signal DLY from the value of the analog oscillation signal WDLY, so as to remove the values of the analog dummy signals DLX and DLY from the values of the corresponding analog oscillation signals WDLX and WDLY. In this way, the subtraction circuit 211L generates analog initial unbalance signals WLX and WLY indicative of initial X-axis and Y-axis rotational unbalance values at the one end 110a (FIG. 1) of the crankshaft 100.

Similarly, to the subtraction circuit 211R are input the analog oscillation signals WDRX and WDRY from the oscillation pickup 201R and the analog dummy signals DRX and DRY from the D/A converters 212R and 213R. Thus, the subtraction circuit 211R subtracts the value of the analog dummy signal DRX from the value of the analog oscillation signal WDRX and subtracts the value of the analog dummy signal DRY from the value of the analog oscillation signal WDRY, so as to remove the values of the analog dummy signals DRX and DRY from the values of the corresponding analog oscillation signals WDRX and WDRY. In this way, the subtraction circuit 211R generates analog initial unbalance signals WRX and WRY indicative of initial X-axis and Y-axis rotational unbalance values at the other end 110b (FIG. 1) of the crankshaft 100.

The subtraction circuits 211L and 211R output the thus-generated analog initial unbalance signals WLX, WLY and WRX, WRY to the A/D converters 214L and 214R, respectively. The outputs of the A/D converters 214L and 214R are coupled to the CPU data bus 223 of the controller 216 via the corresponding digital filters 215L and 215R. In this way, the initial rotational unbalance signals WLX, WLY and WRX, WRY, converted by the A/D converters 214L and 214R into digital representation, are subjected to noise reduction operations by the digital filters 215L and 215R so that the signals WLX, WLY and WRX, WRY can be read appropriately by the controller 216.

The noise-reduced initial rotational unbalance signals WLX, WLY, WRX and WRY read by the controller 216 are processed by the CPU 220 to provide initial rotational unbalance data. According to the instant embodiment, the initial rotational unbalance of the crankshaft is represented, for the individual initial rotational unbalance signals WLX, WLY, WRX and WRY, as functions $WLX(\theta)$, $WLY(\theta)$, $WRX(\theta)$ and $WRY(\theta)$, using, as an argument, a phase $\theta$ based on the position of the key groove of the crankshaft 100 detected by the key groove sensor D7.

Now, a description will be given about an exemplary sequence of operations performed by the crankshaft rotational balance testing apparatus of the present invention for measuring a rotational balance condition of the crankshaft 100. First, predetermined calibration operations are carried out for measurement of the digital dummy data. Note that the predetermined calibration operations may be carried out only once per model of crankshafts; needless to say, parameters obtained through the calibration operations performed for a particular crankshaft may be used for other crankshafts of the same model as the particular crankshaft.

In the calibration operations, there are employed a reference crankshaft and dummy weights. The "reference crankshaft" is an already-adjusted crankshaft which is of the same model as crankshafts to be subjected to the rotational balance condition measurement, whose rotational balance condition is duly adjusted in advance so that the crankpins have no rotational phase error. In the calibration operations to be described below, no digital dummy data is input from the I/O port 219 of the controller 216 to the D/A converters 212R, 213R, 212L and 213L.

In the calibration operations, the dummy weights are first attached to all of the crankpins of the reference crankshaft, and then a rotational balance condition of the reference crankshaft is measured. Thereafter, the amplifier circuits 209R and 209L are adjusted such that the functions $WLX(\theta)$, $WLY(\theta)$, $WRX(\theta)$ and $WRY(\theta)$ normally take the value of zero.

Then, rotational balance condition measurement is performed with the dummy weight removed from the crankpin 101. Measured results thus obtained are represented here by $WLX1(\theta)$, $WLY1(\theta)$, $WRX1(\theta)$ and $WRY1(\theta)$. Since these measured results $WLX1(\theta)$, $WLY1(\theta)$, $WRX1(\theta)$ and $WRY1(\theta)$ represent measurements in the state where only the crankpin 101 has no dummy weight attached thereto, a value calculated by subtracting the measured results WLX1(θ), WLY1(θ), WRX1(θ) and WRY1(θ) from the zero value will represent a correction amount for the dummy weight to be attached to the crankpin 101.

Then, the rotational balance condition measurement is repeated, for each of the other crankpins 102, 103, 104, 105 and 106, with the dummy weight removed from the crankpin in question. Measured results thus obtained are represented here by WLXn(θ), WLYn(θ), WRXn(θ) and WRYn(θ).

In this manner, correction amounts for the dummy weights to be attached to the individual crankpins can be calculated through the calibration operations described above. These calculated correction amounts are stored in the memory 222 of the controller 216.

This and following paragraphs describe how initial rotational unbalance of a crankshaft 100 to be tested is measured in the instant embodiment. In this case, the crankshaft placed on the rollers 110a, 110b, 110c and 110d are rotated about its axis by the electric motor 2 at a predetermined measuring rotation rate. During that time, dynamic rotational unbalance produced on the rotating crankshaft displaces centrifugal force in a circumferential direction of the rotating crankshaft. Thus, inertial force produced during the rotation of the crankshaft acts on the base 13 by way of the measuring table 15 and springs 14. Therefore, the table 15 oscillatably supported on the springs 14 is caused to oscillate together with the crankshaft, so that the oscillation pickups 201L and 201R generate analog oscillation signals WDLX, WDLY and WDRX, WDRY of levels corresponding to the oscillating speed of the table 15. The analog oscillation signals WDLX and WDLY generated by the oscillation pickup 201L are amplified by the amplifier circuit 209L and then supplied to the subtraction circuit 211L, while the analog oscillation signals WDRX and WDRY generated by the oscillation pickup 201R are amplified by the amplifier circuit 209R and then supplied to the subtraction circuit 211R.

In parallel to the above-described operations, the key groove of the crankshaft to be tested is detected via the sensor D7. Namely, the sensor D7 generates a key groove detection pulse signal WK each time the key groove of the rotating crankshaft passes the front of the sensor D7. The key groove detection pulse signal WK is input to the I/O port 219 of the controller 216, on the basis of which the CPU 220 of the controller 216 detects a rotational angle θ of the key groove of the crankshaft in accordance with a generated time of the key groove detection pulse and a rotating speed N of the crankshaft in accordance with a time interval between the generated times of the last and current key groove detection pulses.

In addition, the crankpins 101, 102, 103, 104, 104, 105 and 106 of the crankshaft are detected via the respective phase sensors D1, D2, D3, D4, D5 and D6. Namely, each of the phase sensors D1–D6 generates a crankpin detection pulse signal each time the corresponding crankpin passes the front of the phase sensor. Such crankpin detection pulse signals generated by the phase sensors D1–D6 are input to the I/O port 219 of the controller 216. On the basis of the crankpin detection pulse signals and rotational angle θ of the key groove, the controller 216 calculates respective rotational phases of the crankpins 101–106 relative to the key groove. Further, the controller 216 compares the calculated rotational phases of the crankpins 101–106 to the predetermined rotational phases, relative to the key groove, of the crankpins of the reference crankshaft prestored in the memory 222, so as to determine rotational phase errors of the crankpins 101–106 from the memory-prestored predetermined rotational phases of the reference crankshaft's crankpins. Here, the rotational phase errors of the crankpins 101, 102, 103, 104, 104, 105 and 106 are represented by Δφ1, Δφ2, Δφ3, Δφ4, Δφ5 and Δφ6, respectively.

Then, the CPU 220 generates digital dummy data DWLX(θ), DWLY(θ), DWRX(θ) and DWRY(θ), on the basis of the results of the calibration operations and rotational phase errors of the individual crankpins of the crankshaft, using the mathematical expression below.

$$DWLX(\theta) = WLX1(\theta + \Delta\phi1) + WLX2(\theta + \Delta\phi2) + WLX3(\theta + \Delta\phi3) +$$
$$WLX4(\theta + \Delta\phi4) + WLX5(\theta + \Delta\phi5) + WLX6(\theta + \Delta\phi6)$$
$$DWLY(\theta) = WLY1(\theta + \Delta\phi1) + WLY2(\theta + \Delta\phi2) + WLY3(\theta + \Delta\phi3) +$$
$$WLY4(\theta + \Delta\phi4) + WLY5(\theta + \Delta\phi5) + WLY6(\theta + \Delta\phi6)$$
$$DWRX(\theta) = WRX1(\theta + \Delta\phi1) + WRX2(\theta + \Delta\phi2) + WRX3(\theta + \Delta\phi3) +$$
$$WRX4(\theta + \Delta\phi4) + WRX5(\theta + \Delta\phi5) + WRX6(\theta + \Delta\phi6)$$
$$DWRY(\theta) = WRY1(\theta + \Delta\phi1) + WRY2(\theta + \Delta\phi2) + WRY3(\theta + \Delta\phi3) +$$
$$WRY4(\theta + \Delta\phi4) + WRY5(\theta + \Delta\phi5) + WRY6(\theta + \Delta\phi6)$$

Once the rotating speed N of the crankshaft 100 to be tested has reached a measurable range, the CPU 220 supplies the digital dummy data DWLX(θ), DWLY(θ) and DWRX(θ), DWRY(θ), representative of dummy weights to act on the one end 110a and other end 110b of the crankshaft 100, to the respective D/A converters 212L, 213L and 212R and 213R in correspondence with the phase θ and rotating speed N of the crankshaft 100. In turn, the D/A converters 212L, 213L, 212R and 213R generate analog dummy signals DLX, DLY and DRX, DRY in synchronism with the rotation of the crankshaft 100. The thus-generated analog dummy signals DLX, DLY and DRX, DRY are delivered to the respective subtraction circuits 211L and 211R.

Then, the subtraction circuit 211L subtracts the waveform amplitude values of the analog dummy signals DLX and DLY from the waveform amplitude values of the corresponding analog oscillation signals WDLX and WDLY received from the oscillation pickup 201L via the amplifier circuit 209L, to thereby generate analog initial rotational unbalance signals WLX and WLY. The analog initial rotational unbalance signals WLX and WLY thus generated by the subtraction circuit 211L are converted by the A/D converter 214L into digital initial rotational unbalance values. The thus-converted digital initial rotational unbalance values are input to the controller 216, so that the controller 216 can determine a correction amount and angular position of the initial rotational unbalance at the one end 110a (FIG. 1) of the crankshaft 100.

Similarly, the subtraction circuit 211R subtracts the waveform amplitude values of the analog dummy signals DRX and DRY from the waveform amplitude values of the corresponding analog oscillation signals WDRX and WDRY received from the oscillation pickup 201R via the amplifier circuit 209R, to thereby generate analog initial rotational unbalance signals WRX and WRY. The analog initial rotational unbalance signals WRX and WRY thus generated by the subtraction circuit 211R are converted by the A/D converter 214R into digital initial rotational unbalance values. The thus-converted digital initial rotational unbalance values are input to the controller 216, so that the controller 216 can determine a correction amount and angular position of the initial rotational unbalance at the other end 110b (FIG. 1) of the crankshaft 100.

In summary, the rotational balance testing apparatus and method of the present invention arranged in the above-described manner can facilitate automatization of the rotational balance condition measurement of a crankpin, and can accurately measure rotational balance conditions of the crankpin, even where the crankpins of the crankshaft have rotational phase errors from predetermined rotational phases.

The present disclosure relates to the subject matters of Japanese Patent Application No. 2002-141488, filed May 16, 2002, and No. 2003-133565, filed May 12, 2003, the disclosures of which are expressly incorporated herein by reference in their entireties.

What is claimed is:

1. A crankshaft rotational balance testing apparatus comprising:
   crankshaft rotation means for rotating a crankshaft to be tested about a central axis of the crankshaft;
   sensor means for detecting positional variations of the central axis of a tested crankshaft being rotated and producing an analog vibration signal representative of the detected positional variations of the central axis of the tested crankshaft;
   a memory that stores digital reference dummy data comprising equivalent dummy amounts indicative of predetermined amounts of unbalance to be left in respective crankpins of each tested crankshaft, the digital reference dummy data being determined in advance using a balance-adiusted reference crankshaft having crankpins with no rotational phase error and with dummy weights attached thereto;
   phase error determination means for determining errors in rotational phase of respective crankpins of the tested crankshaft while the tested crankshaft is being rotated about its central axis;
   dummy information generation means for creating digital dummy data representative of rotational unbalance components to be removed from detected positional variations of the central axis of the tested crankshaft, by retrieving the digital reference dummy data from the memory and modifying the retrieved digital reference dummy data according to the rotational phase errors of the respective crankpins of the tested crankshaft determined by the phase error determination means, such that the equivalent dummy amounts thereafter produce rotational unbalance components oscillating in phase with the respective crankpins of the tested crankshaft;
   a digital-to-analog converter for converting the digital dummy data into an analog dummy signal;
   a waveform synthesizing circuit for performing subtractive synthesis of the analog vibration signal and the analog dummy signal to thereby produce an analog initial unbalance signal indicative of an amount and an angle of initial unbalance of the tested crankshaft; and
   an analog-to-digital converter for converting the analog initial unbalance signal to a digital initial unbalance signal.

2. The crankshaft rotational balance testing apparatus of claim 1, wherein the sensor means are oscillation pickups.

3. The crankshaft rotational balance testing apparatus of claim 2, wherein the oscillation pickups are comprised of acceleration sensors.

4. The crankshaft rotational balance testing apparatus of claim 1, wherein the phase error determination means includes a plurality of proximity sensors for detecting the presence of respective crankpins.

5. The crankshaft rotational balance testing apparatus of claim 4, wherein the phase error determination means includes a sensor for detecting a key groove located in the crankshaft.

6. A crankshaft rotational balance testing method comprising the steps of:
   (a) storing in a memory digital reference dummy data comprising equivalent dummy amounts indicative of predetermined amounts of unbalance to be left in respective crankpins of a crankshaft to be tested, the digital reference dummy data being determined in advance using a balance-adjusted reference crankshaft having crankpins with no phase error and with dummy weights attached thereto;
   (b) detecting positional variations of a central axis of a crankshaft to be tested while rotating the crankshaft about the central axis thereof and producing an analog vibration signal representative of the detected positional variations of the central axis of the tested crankshaft;
   (c) determining errors in rotational phase of respective crankpins of the tested crankshaft while the tested crankshaft is being rotated about its central axis;
   (d) creating digital dummy data representative of rotational unbalance components to be removed from the detected positional variations of the central axis of the tested crankshaft, by retrieving the digital reference dummy data from the memory and modifying the retrieved digital reference dummy data according to the determined rotational chase errors of the respective crankpins of the tested crankshaft, such that the equivalent dummy amounts thereafter produce rotational unbalance components oscillating in phase with the respective crankpins of the tested crankshaft;
   (e) converting the digital dummy data into an analog dummy signal;
   (f) performing subtractive synthesis of the analog vibration signal and the analog dummy signal to thereby produce an analog initial unbalance signal indicative of an amount and an angle of initial unbalance of the tested crankshaft;
   (g) converting the analog initial unbalance signal to a digital initial unbalance signal; and
   (h) repeating steps (b) to (g) for each subsequent crankshaft to be tested.

7. The crankshaft rotational balance testing method of claim 6, further comprising a calibration operation performed on the balance-adjusted reference crankshaft.

8. The crankshaft rotational balance testing method of claim 7, wherein during the calibration operation, dummy weights are attached to all of the crankpins of the reference crankshaft before the reference crankshaft is rotated.

9. The crankshaft rotational balance testing method of claim 8, further comprising adjusting controller amplifier circuits such that positional variations of the central axis of the reference crankshaft detected during rotation thereof are set substantially to zero.

10. The crankshaft rotational balance testing method of claim 9, further comprising:
    (a) removing the dummy weight from a particular crankpin;.
    (b) rotating the reference crankshaft;
    (c) determining the balance condition of the reference crankshaft with the dummy weight removed;
    (d) comparing the balance condition of the reference crankshaft with the dummy weight removed to the zero value to obtain a correction amount for the dummy weight to be attached to the crank pin;

(e) storing the correction amount in memory; and (f) repeating steps (a)–(e) for the remaining crankpins.

11. The crankshaft rotational balance testing method of claim 6, further comprising providing a sensor to detect a key groove located in the tested crankshaft and to generate a key groove detection signal in response to detection thereof.

12. The crankshaft rotational balance testing method of claim 11, further comprising determining a key groove rotational angle based on the time of the key groove detection signal and a rotational speed of the crankshaft.

13. The crankshaft rotational balance testing method of claim 12, further comprising determining the rotational phase of the crankpins of the tested crankshaft by comparing detection signals from crankpin phase sensors to the rotational angle of the key groove.

14. The crankshaft rotational balance testing method of claim 13, further comprising determining rotational phase error of the crankpins of the tested crankshaft by comparing the determined rotational phase of its crankpins to a stored and predetermined rotational phase for corresponding crankpins of the reference crankshaft.

* * * * *

UNITED STATES PATENT AND TRADEMARK OFFICE
CERTIFICATE OF CORRECTION

| | |
|---|---|
| PATENT NO. | : 6,840,104 B2 |
| APPLICATION NO. | : 10/438568 |
| DATED | : January 11, 2005 |
| INVENTOR(S) | : Tamura et al. |

It is certified that error appears in the above-identified patent and that said Letters Patent is hereby corrected as shown below:

Title page, item (73) Assignee, after "Honda Giken Kogyo Kabushiki Kaisha, Tokyo (JP)," insert --and Kokusai Co., Ltd., Tokyo (JP)--

Signed and Sealed this

Twenty-seventh Day of November, 2007

JON W. DUDAS
*Director of the United States Patent and Trademark Office*